United States Patent
Tachiki (10) Patent No.: US 11,135,695 B2
(45) Date of Patent: Oct. 5, 2021

(54) ROTARY TABLE DEVICE, ROTARY TABLE CONTROLLER, PROGRAM RECORDING MEDIUM, AND ROTARY TABLE CONTROL METHOD

(71) Applicant: FANUC CORPORATION, Yamanashi (JP)

(72) Inventor: Shingo Tachiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 117 days.

(21) Appl. No.: 16/591,270

(22) Filed: Oct. 2, 2019

(65) Prior Publication Data

US 2020/0139500 A1  May 7, 2020

(30) Foreign Application Priority Data

Nov. 2, 2018  (JP) .............................. JP2018-207079

(51) Int. Cl.
*B23Q 16/10* (2006.01)
*B23Q 15/013* (2006.01)
(Continued)

(52) U.S. Cl.
CPC ......... *B23Q 16/105* (2013.01); *B23H 11/003* (2013.01); *B23Q 1/52* (2013.01);
(Continued)

(58) Field of Classification Search
CPC .. B23Q 16/105; B23Q 16/107; B23Q 16/102; B23Q 2705/005; B23Q 1/52;
(Continued)

(56) References Cited

U.S. PATENT DOCUMENTS

2015/0251286 A1* 9/2015 Nishimura ........... B23Q 16/105
    279/4.04
2015/0252861 A1* 9/2015 Jantunen ................... G01L 5/28
    324/537

(Continued)

FOREIGN PATENT DOCUMENTS

JP    2001-047342 A    2/2001
JP    2002-001633 A    1/2002

(Continued)

OTHER PUBLICATIONS

An Office Action; "Notice of Reasons for Refusal", mailed by the Japanese Patent Office dated Dec. 8, 2020, which corresponds to Japanese Patent Application No. 2018-207079 and is related to U.S. Appl. No. 16/591,270; with English language translation.

*Primary Examiner* — Daniel D Yabut
(74) *Attorney, Agent, or Firm* — Studebaker & Brackett PC (57) ABSTRACT

A rotary table device according to the present invention includes: a spindle that supports a table; a driving mechanism that drives the spindle; a load detection portion that detects a load of the driving mechanism; a clamp mechanism that inhibits rotation of the spindle; a rotation control portion that causes the driving mechanism to drive the spindle with a predetermined inspection pattern after the clamp mechanism starts releasing clamping; and a determination portion that determines whether good or not with respect to an operation of the clamp mechanism based on of change over time in the load detected by the load detection portion when the spindle is driven with the inspection pattern.

5 Claims, 7 Drawing Sheets (51) Int. Cl.
*B23Q 1/52* (2006.01)
*B23Q 11/08* (2006.01)
*B23H 11/00* (2006.01)

(52) U.S. Cl.
CPC ........ *B23Q 11/0883* (2013.01); *B23Q 15/013* (2013.01); *B23Q 2220/004* (2013.01)

(58) Field of Classification Search
CPC ............ B23Q 11/0083; B23Q 11/0092; B23Q 15/013; B23Q 2220/004; B23H 11/003; G01L 5/28; G01L 5/288; Y10T 74/1488; Y10T 74/1453–1465
See application file for complete search history.

(56) References Cited

U.S. PATENT DOCUMENTS

2015/0360337 A1* 12/2015 Nishimura ......... G05B 19/4155
269/57
2017/0299452 A1* 10/2017 Yasuda .................... G01L 5/28

FOREIGN PATENT DOCUMENTS

| | | |
|---|---|---|
| JP | 2005-254410 A | 9/2005 |
| JP | 2012198734 A | 10/2012 |
| JP | 2015-126647 A | 7/2015 |
| JP | 2016-002613 A | 1/2016 |
| JP | 2017-074837 A | 4/2017 |

* cited by examiner

ROTARY TABLE DEVICE, ROTARY TABLE CONTROLLER, PROGRAM RECORDING MEDIUM, AND ROTARY TABLE CONTROL METHOD

BACKGROUND OF THE INVENTION

This application is based on and claims the benefit of priority from Japanese Patent Application No. 2018-207079, filed on 2 Nov. 2018, the content of which is incorporated herein by reference.

FIELD OF THE INVENTION

The present invention relates to a rotary table device, a rotary table controller, a program recording medium, and a rotary table control method.

RELATED ART

Conventionally, a rotary table device that rotates a table on which surface a work, a jig, or the like is fixed is used in a machine tool or the like. The rotary table device has a rotatable spindle on which end a table is fixed, and the spindle is rotated by a servo motor or the like to realize positioning (indexing) of a rotating position of the table. The rotary table device is often provided with a clamp mechanism that clamps (sandwiches) a spindle in order to hold an indexing position of a table.

In general, a clamp mechanism of a rotary table device is configured as follows. A brake disc provided on a spindle is pressed against a clamping member provided immovably by a piston that is moved in a direction parallel to the spindle with fluid pressure. In this way, rotation of the brake disc and therefore the spindle is prevented by frictional force. In such a clamp mechanism, malfunction such as an operation delay or stroke reduction of a piston due to the influence of a use environment or aging may occur.

When a spindle is rotated in a state of large frictional force between a brake disc and a clamping member and a piston, abrasion of at least one of the brake disc, the clamping member, and the piston is accelerated. In this case, the frictional force (brake torque) during clamping may decrease and a problem that the table is shifted or the like may occur. A technology in which a proximity switch or the like is provided to detect the position of a piston so that a spindle is driven after release of clamping is confirmed is known. However, when the position of a piston is detected, it is not possible to start driving the spindle until the piston is sufficiently separated from a brake disc. With increase in the speed of machine tools in recent years, it is requested to shorten the time elapsed until rotation of the spindle starts after unclamping starts. However, since a moving speed of the piston with fluid pressure is not sufficiently large, a relative long period is taken until the piston reaching a separated position is detected after unclamping starts. Moreover, when a proximity switch or the like is used, a problem such as increase in an apparatus size, increase in the cost, and decrease in reliability occurs.

Therefore, Patent Document 1 proposes a technology of issuing such a command to rotate a spindle by a minute movement amount when unclamping starts, and issuing a command to rotate the spindle by a remaining movement amount obtained by subtracting a detected movement amount from a target movement amount after rotation of the spindle is detected. According to this technology, it is considered that rotation of the spindle by a target movement amount is realized in a short period while suppressing abrasion of a brake disc or the like resulting from unnatural rotation of the spindle before clamping is released completely.

Patent Document 1: Japanese Unexamined Patent Application, Publication No. 2012-198734

SUMMARY OF THE INVENTION

In a control method disclosed in Patent Document 1, since the spindle is driven so as to be rotated by a minute movement amount before clamping is released completely, abrasion of a brake disc or the like is accelerated to a certain extent. In the control method disclosed in Patent Document 1, although it is possible to suppress abrasion of the brake disc when detecting unclamping by decreasing a setting value of the minute movement amount, it is not possible to detect unlock of a clamp mechanism reliably the minute movement amount is decreased too much. Therefore, in the control method disclosed in Patent Document 1, the spindle may be driven before the brake torque is decreased sufficiently whereby abrasion of the clamp mechanism is accelerated.

Therefore, an object of the present invention is to provide a rotary table device, a rotary table controller, a program, and a rotary table control method capable of detecting malfunction of a clamp mechanism while suppressing abrasion of the clamp mechanism.

(1) A rotary table device (for example, a rotary table device 100 to be described later) according to the present invention includes: a spindle (for example, a spindle 1 to be described later) that supports a table; a driving mechanism (for example, a driving mechanism 2 to be described later) that drives the spindle; a load detection portion (for example, a load detection portion 3 to be described later) that detects a load of the driving mechanism; a clamp mechanism (for example, a clamp mechanism 4 to be described later) that inhibits rotation of the spindle; a rotation control portion (for example, a rotation control portion 54 to be described later) that causes the driving mechanism to drive the spindle with a predetermined inspection pattern after the clamp mechanism starts releasing clamping; and a determination portion (for example, a determination portion 55 to be described later) that determines whether good or not with respect to an operation of the clamp mechanism based on of change over time in the load detected by the load detection portion when the spindle is driven with the inspection pattern.

(2) in the rotary table device according to (1), the inspection pattern may be a pattern in which the spindle is driven by a predetermined inspection angle when a predetermined first period has elapsed after the clamp mechanism starts releasing clamping and when a predetermined second period has elapsed further after the elapse of the first period, and the determination portion may determine that the operation of the clamp mechanism is not good when a difference between a first peak load value after the elapse of the first period and a first peak load value after the elapse of the second period is a predetermined threshold or more.

(3) in the rotary table device according to (1), the inspection pattern may be a pattern in which the spindle is driven by a predetermined inspection angle after the clamp mechanism starts releasing clamping, and the determination portion may determine whether good or not with respect to the operation of the clamp mechanism based on of a waveform of the load detected by the load detection portion during driving with the inspection pattern.

(4) The rotary table device according to any one of (1) to (3) may further include: an output portion (for example, an output portion 56 to be described later) that notifies the outside of information related to a determination result or outputs a signal related to the determination result, when the determination portion determines that the operation of the clamp mechanism has malfunctioned.

(5) A rotary table controller (for example, a controller 5 to be described later) according to the present invention is a controller that controls a rotary table device including a spindle that supports a table, a driving mechanism that drives the spindle, a load detection portion that detects a load of the driving mechanism, and a clamp mechanism that inhibits rotation of the spindle, the controller including: a rotation control portion that causes the driving mechanism to drive the spindle with a predetermined inspection pattern after the clamp mechanism starts releasing clamping; and a determination portion that determines whether good or not with respect to an operation of the clamp mechanism based on of change over time in the load detected by the load detection portion when the spindle is driven with the inspection pattern.

(6) A program according to the present invention is a program for controlling a rotary table device including a spindle that supports a table, a driving mechanism that drives the spindle, a load detection portion that detects a load of the driving mechanism, and a clamp mechanism that inhibits rotation of the spindle, the program including: a rotation control element for causing the driving mechanism to drive the spindle with a predetermined inspection pattern after the clamp mechanism starts releasing clamping; and a determination element for determining whether good or not with respect to an operation of the clamp mechanism based on of change over time in the load detected by the load detection portion when the spindle is driven with the inspection pattern.

(7) A rotary table control method according to the present invention is a control method for a rotary table device including a spindle that supports a table, a driving mechanism that drives the spindle, a load detection portion that detects a load of the driving mechanism, and a clamp mechanism that inhibits rotation of the spindle, the method including: causing the driving mechanism to drive the spindle with a predetermined inspection pattern after the clamp mechanism starts releasing clamping (for example, a spindle driving step S2 to be described later); and determining whether good or not with respect to an operation of the clamp mechanism based on of change over time in the load detected by the load detection portion when the spindle is driven with the inspection pattern (for example, a determination step S5 to be described later).

According to the present invention, it is possible to detect malfunction of a clamp mechanism wile suppressing abrasion of the clamp mechanism.

DETAILED DESCRIPTION OF THE INVENTION

Figure 1:
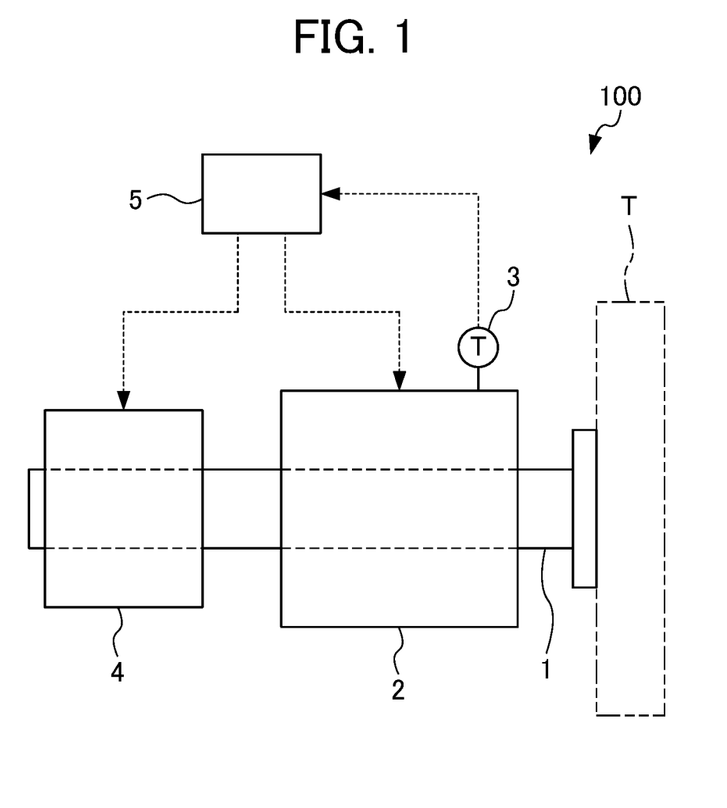
FIG. 1 is a configuration diagram of a rotary table device according to the present invention.
Figure 2:
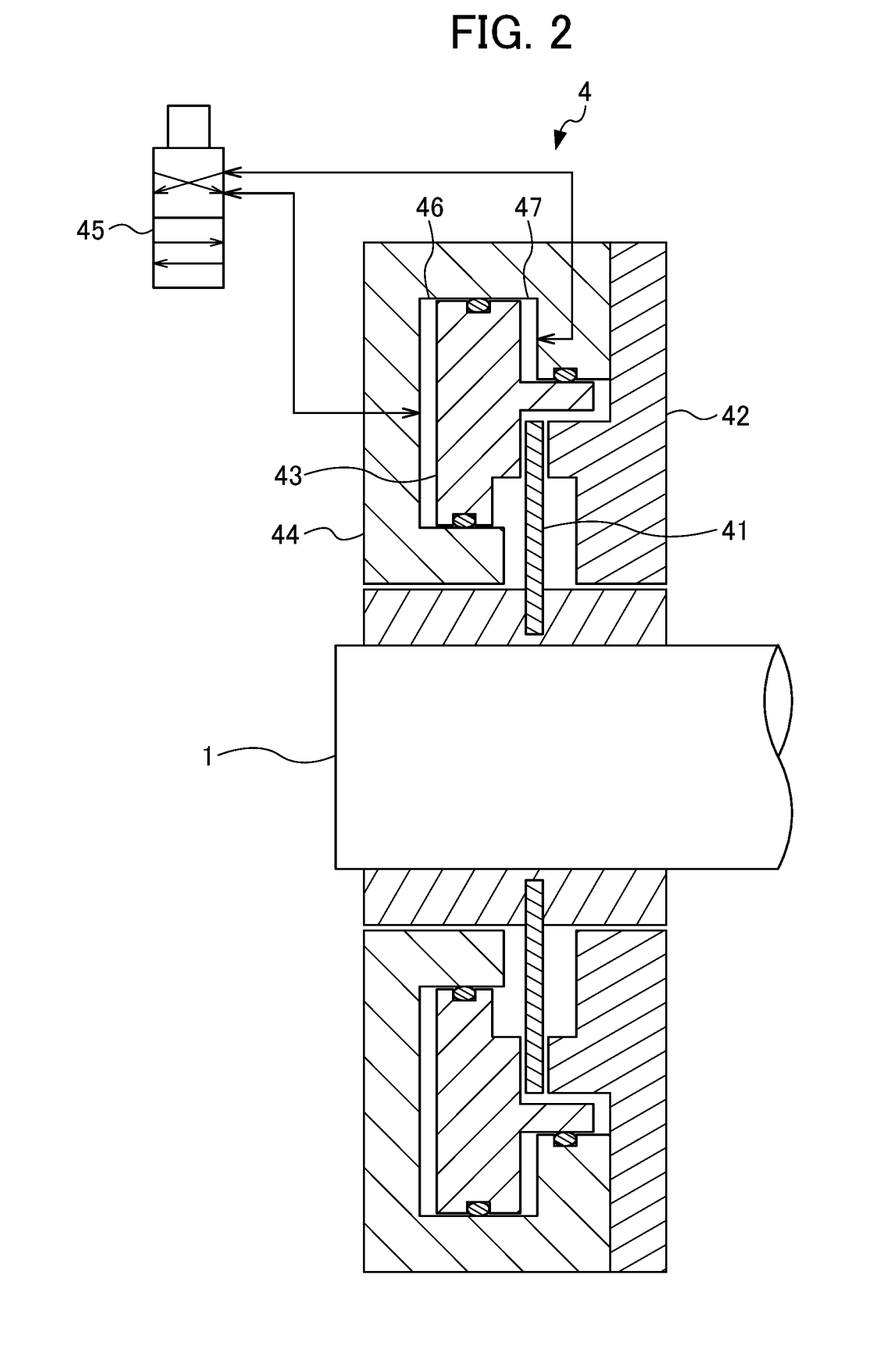
FIG. 2 a cross-sectional view illustrating a configuration of a clamp mechanism of the rotary table device illustrated in FIG. 1.

Hereinafter, an embodiment of the present invention will be described with reference to the drawings. FIG. 1 is a block diagram of a rotary table device 100 according to one embodiment of the present invention. FIG. 2 is a cross-sectional view illustrating a machine configuration of a clamp mechanism of the rotary table device illustrated in FIG. 1.

The rotary table device 100 includes a spindle 1 that supports a table T indicated by a two-dot-chain line at one end thereof, a driving mechanism 2 that rotates the spindle 1, a load detection portion 3 that detects a load of the driving mechanism 2, a clamp mechanism 4 that clamps the spindle 1 to fix an angular position thereof, and a controller 5 that controls the driving mechanism 2 and the clamp mechanism 4.

The spindle 1 is rotated by the driving mechanism 2 so that a table 1 supported at one end thereof is rotated integrally.

The driving mechanism 2 is typically configured as a direct-drive servo motor having an output shaft formed integrally with the spindle 1. The driving mechanism 2 may drive the spindle 1 through a shaft coupling, a transmission mechanism, a reduction gear, and the like, for example.

The load detection portion 3 may be configured, for example, as a torque sensor that detects a load torque inside the driving mechanism 2 or between the driving mechanism 2 and the spindle 1, an ammeter that detects a load current of a motor serving as a power source of the driving mechanism 2, or a wattmeter that detects an electric load power.

As illustrated in detail in FIG. 2, the clamp mechanism 4 may include a circular disc-shaped brake disc 41, a clamping member 42, a piston 43, a housing 44, and a switching valve 45, for example. The brake disc 41 is fixed to an outer circumference of the spindle 1 and rotates integrally with the spindle 1. The clamping member 42 is arranged immovably to be adjacent to one surface of the brake disc 41 so as not to rotate together with the spindle 1. The piston 43 is provided on the side of the other surface of the brake disc 41 so as to be movable in a direction parallel to the spindle 1 with fluid pressure. The housing 44 is provided with the clamping member 42 attached thereto and accommodates the piston 43 so as to be movable. The switching valve 45 controls supply and discharge of an operating fluid that moves the piston 43.

The housing 44 forms a first space 16 in which fluid pressure acts on a pressure-receiving surface on one side in a moving direction of the piston 43 and a second space 47 in which fluid pressure acts on a pressure-receiving surface on the other side in the moving direction of the piston 43. The switching valve 45 switches a passage so that operating fluid is supplied to one of the first space 46 and the second space 47 and operating fluid is discharged from the other of the first space 46 and the second space 47. Although oil (pressurized oil) or air (compressed air) is typically used as the operating fluid, other liquid or gas may be used.

The clamp mechanism 4 presses the piston 43 against the brake disc 41 with fluid pressure to bring a surface on the opposite side of the brake disc 41 into pressure-contact with the clamping member 42 to generate large frictional force between the brake disc 41 and the clamping member 42 and the piston 43 to inhibit the rotation of the spindle 1 rotating integrally with the brake disc 41 (clamp). Moreover, the clamp mechanism 4 separates the piston 43 from the brake disc 41 with fluid pressure to remove pressure-contact force (normal force causing friction) between the brake disc 41 and the clamping member 42 and the piston 43 to enable the spindle 1 to rotate (unclamp).

The controller 5 itself is arm embodiment of a rotary table controller according to the present invention and is a device that performs a rotary table control method according to the present invention. The controller 5 can be configured as a dedicated integrated circuit, or the like, or can be realized by a general-purpose computer reading a program according to the present invention. Therefore, description of operation checking of the clamp mechanism 4 to be described later may be replaced with description of the rotary table device, the rotary table controller, the program, and the rotary table control method according to the present invention. Further, the controller 5 may be a part of a controller that controls a machine tool or the like. That is, the program according to the present invention may be a subroutine, a part program, or the like incorporated into a control program of a machine tool. The program according to the present invention may be provided in a state of being recorded on a non-transitory recording medium.

Figure 3:
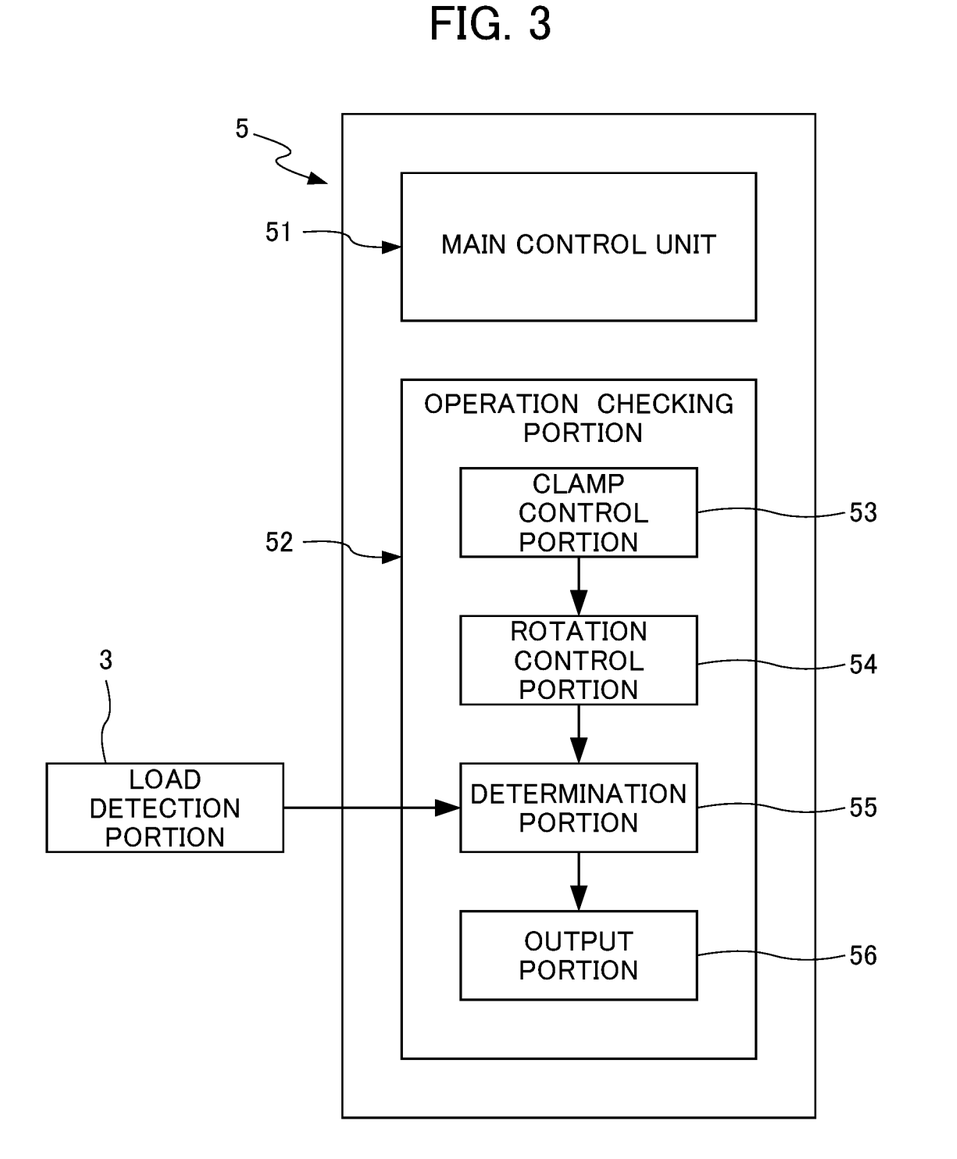
FIG. 3 is a block diagram of a controller of the rotary table device illustrated in FIG. 1.

As illustrated in FIG. 3, the controller 5 includes a main control portion 51 that operates the driving mechanism 2 and the clamp mechanism 4 so as to realize positioning (indexing) of a rotating position of the table 1 according to a request from a machine tool or the like and an operation checking portion 52 that checks an operating state of the clamp mechanism 4. The main control portion 51, the operation checking portion 52, and a plurality of elements are functionally distinguished and may not be clearly distinguished in the structure of a program for realizing the controller 5 and a physical configuration.

The main control portion 51 controls the driving mechanism 2 so as to realize positioning of a rotating position of the spindle 1 in order to perform indexing of the table T according to a request of a machine tool or the like. Moreover, when holding the position of the table T, the main control portion 51 causes the clamp mechanism 4 to inhibit rotation of the spindle 1 (clamp) so that the table T is not shifted by vibration or the like of a machine tool when changing the position of the table T, the main control portion 51 causes the clamp mechanism 4 to release clamping (unclamp) so that the spindle 1 can rotate.

The operation checking portion 52 includes a clamp control portion 53, a rotation control portion 54, a determination portion 55, and an output portion 56. The clamp control portion 53 instructs the clamp mechanism 4 to perform unclamping. The rotation control portion 54 causes the driving mechanism 2 to drive the spindle 1 with a predetermined inspection pattern after the clamp mechanism 4 starts unclamping. The determination portion 55 determines whether good or not with respect to an operation of the clamp mechanism 4 based on of change over time in the load detected by the load detection portion 3 when the spindle 1 is driven with an inspection pattern. The output portion 56 notifies the outside of information on malfunction of the clamp mechanism 4 or outputs a signal related to the malfunction. Therefore, a program for realizing the controller 5 includes a program element (an unclamp control element) that realizes the clamp control portion 53, a program element (a rotation control element) that realizes the rotation control portion 54, a program element (a determination element) that realizes the determination portion 55, and a program element (an output control element) that realizes the output portion 56.

The operation checking portion 52 checks whether the operation of the clamp mechanism 4 is good. Checking the operation of the clamp mechanism 4 is preferably performed, for example, when a predetermined period has elapsed, a predetermined operation period has elapsed, or an unclamping operation has been executed a predetermined number of times, and is more preferably performed at an earliest timing at which the above-described condition is satisfied and there is no influence on other operations of a machine tool even when the spindle 1 is moved. Moreover, checking the operation of the clamp mechanism 4 may be performed when a predetermined event such as activation of a machine tool or replacement of a work occurs.

The clamp control portion 53 outputs a control signal for instructing the clamp mechanism 4 to perform unclamping.

The rotation control portion 54 starts outputting such a signal to the driving mechanism 2 so that the spindle 1 is driven with a predetermined inspection pattern when the clamp mechanism 4 starts releasing clamping, i.e. when the clamp control portion 53 outputs a control signal for instructing unclamping. The signal output to the driving mechanism 2 is a signal that gives an instruction on an angular position to a servo motor which is a driving source of the driving mechanism 2, for example.

The inspection pattern may be a signal that changes a target angular position of the spindle 1 in a very small step form and may be a signal that changes the target angular position of the spindle 1 in a stair form or a rectangular wave form. As a change in the target angular position of the spindle 1 in one step of such an inspection pattern (hereinafter referred to as an inspection angle), the inspection angle is preferably set to be equal to or larger than a value at which the load detected by the load detection portion 3 is stabilized in case that the target angular position changes in a step form by the inspection angle in a state in which the clamp mechanism 4 is completely unclamped. As a specific example, the inspection angle may be a smallest displacement of the servo motor which is a driving source of the driving mechanism 2 regardless of the configuration of the driving mechanism 2. For example, by setting the inspection angle to equal to or more than 0.1° and equal to or less than 1.0°, the load detection portion 3 can detect the load with high reproducibility.

Moreover, the inspection pattern may be changed in the target angular position of the spindle 1 when a predetermined very short first period (a very short waiting time) has elapsed after the clamp mechanism 4 starts releasing clamping. The first period may be a period corresponding to a shortest period required until the clamp mechanism 4 releases the spindle 1 after the clamp control portion 53 issues an unclamping instruction when the clamp mechanism 4 operates normally. By setting the first period in such a manner, it is possible to suppress the driving mechanism 2 from driving the spindle 1 unnecessarily in a state in which the clamp mechanism 4 inhibits rotation of the spindle 1 and suppress abrasion of the brake disc 41 or the like of the clamp mechanism 4. However, if the first period is set to be longer than necessary, it is difficult to detect a delay in the operation of the clamp mechanism 4 in an early stage. The value of the first period depends on the structure of the clamp mechanism 4 and may be equal to or more than 50 msec and equal to or less than 500 msec, for example.

In case of that the inspection pattern is a stepwise pattern, a second period from the initial change in the target angular position of the spindle 1 until at the first period until subsequent change in the target angular position of the spindle 1 at is preferably set to a value corresponding to a period in which it is considered that unclamping will be completed even with a moving speed of the piston 43 of the clamp mechanism 4 has decreased. The value of the second period depends on the structure of the clamp mechanism 4 or the like and may be equal to or more than 0.5 sec and equal to or less than 2 sec, for example.

Moreover, the subsequent driving of the spindle 1 by an inspection angle after the spindle 1 is driven by the inspection angle when the first period elapses may be performed when it is confirmed by a sensor or the like that the piston 43 of the clamp mechanism 4 has been completely separated from the brake disc 41. That is, the second period may be a variable period.

By driving the spindle 1 by the inspection angle again when the second period elapses using a stepwise pattern as the inspection pattern, the load detection portion 3 can confirm variation in the load of the driving mechanism 2 when the spindle 1 was driven by the inspection angle in a state in which the clamping of the clamp mechanism 1 is released completed. Therefore, by comparing the load variation with a load variation detected by the load detection portion 3 when the spindle 1 was driven by the inspection angle when the first period elapsed, a criterion for determining whether the load variation after the elapse of the first period is normal or indicates malfunction of the clamp mechanism 4 can be provided as necessary. For this reason, it is possible to determine the operating state of the clamp mechanism 4 accurately while eliminating the influence such as change in the load of the driving mechanism 2 resulting from a work held on the table T, for example.

The determination portion 55 extracts predetermined information from change over time in the load detected by the load detection portion 3 when the driving mechanism 2 drives the spindle 1 with an inspection pattern, for example, and determines whether good or not with respect to the operation of the clamp mechanism 4.

Specifically, the determination portion 55 may be configured to extract and compare features corresponding to the change over time in the load of the driving mechanism 2 when the spindle 1 was driven after the elapse of the first period and the change over time in the load of the driving mechanism 2 when the spindle 1 was driven after the elapse of the second period. When the difference between both features is large, the determination portion 55 determines that the clamp mechanism 4 has not completed unclamping after the elapse of the first period and has malfunctioned. Examples of the extracted features of the change over time in the load include a peak value, a peak area, an attenuation time, a form factor, and the like. The clamp mechanism 4 can compare these digitizable features and determine that the clamp mechanism 4 malfunctions when the difference is equal to or larger than a predetermined threshold. Particularly, a peak value is relatively easy to extract and reflects a frictional torque of the clamp mechanism 4 relatively accurately and significantly. Therefore, the determination portion 55 can detect malfunction of the clamp mechanism 4 relatively easily and reliably by extracting a peak value of the load.

Moreover, the determination portion 55 may determine whether good or not with respect to the operation of the clamp mechanism 4 based on of one of the features of change over time in the load of the driving mechanism 2 when the spindle 1 was driven with the inspection pattern. That is, the determination portion 55 may compare the features of change over time in the load detected by the load detection portion 3 when the spindle 1 was driven with the inspection pattern and the predetermined features corresponding to the change over time in the load when the clamp mechanism 4 operates normally and may determine that the clamp mechanism 4 malfunctions when the difference between the features is large. Since an absolute value of the load during driving may change depending on a work or the like fixed to the table T, it is preferable to extract such features which can be used as a criterion for the degree of similarity of waveform when the features are compared to the predetermined features during a normal operation of the clamp mechanism 4.

When the determination portion 55 determines that the clamp mechanism 4 malfunctions, the output portion 56 notifies the outside of information related to the determination result or outputs a signal related to the determination result. As means for notification to the outside, a visual signal (a rotary light, a monitor display, or the like), an audible signal (a beep sound, a voice announcement, or the like), and the like can be used.

Figure 4:
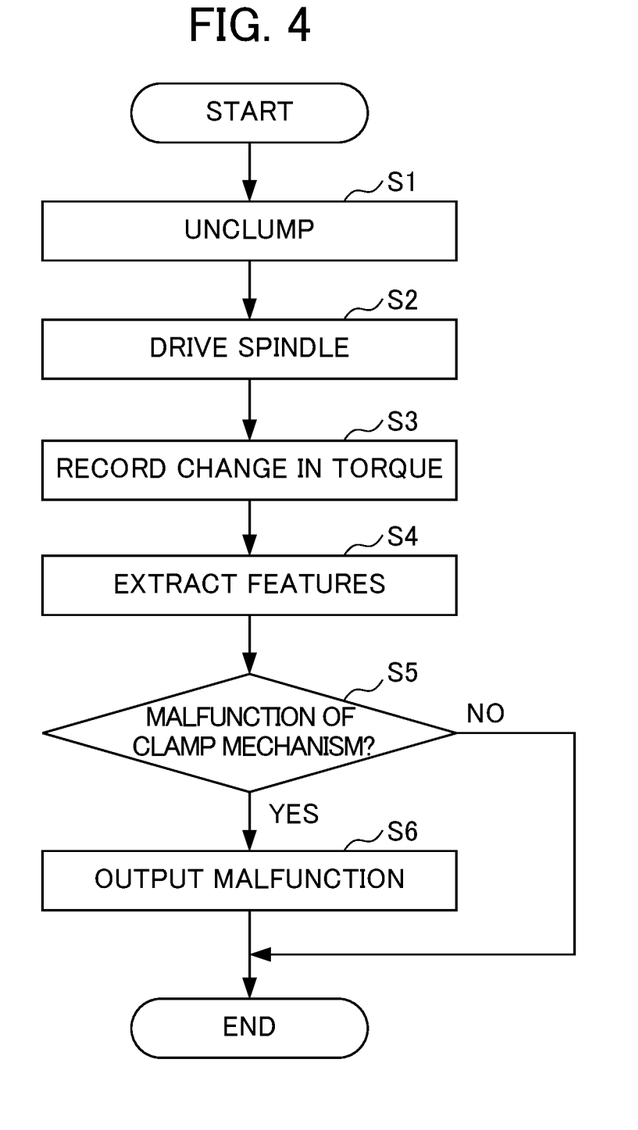
FIG. 4 is a flowchart illustrating a control procedure of the rotary table device illustrated in FIG. 1.

Next, a procedure of checking the operation of the clamp mechanism 4 by the operation checking portion 52 will be described in detail by referring to FIG. 4.

According to the procedure of checking the operation of the clamp mechanism 4 by the operation checking portion 52, first, in an unclamping step S1, the clamp control portion 53 causes the clamp mechanism 4 to release (unclamp) the spindle 1.

Subsequently, in a spindle driving step S2, the rotation control portion 54 causes the driving mechanism 2 to drive the spindle 1 with a predetermined inspection pattern. In a torque change recording step S3, the determination portion 55 records (stores in a memory or the like) the change over time in the load torque of the driving mechanism 2 detected by the load detection portion 3 in a state in which the driving mechanism 2 drives the spindle 1 with the inspection pattern.

After that, the determination portion 55 extracts predetermined features such as a peak value or the like from the change over time in the load torque recorded in step S3 in a feature extraction step S4 and determines whether good or not with respect to the operation of the clamp mechanism 4 from the extracted features in a determination step S5.

When it is determined in step S5 that the operation of the clamp mechanism 4 is not good (step S5: YES), the flow proceeds to step S6, the output portion 56 outputs information on the determination result to the outside, and then the process ends. On the other hand, when it is determined in step S5 that the operation of the clamp mechanism 4 is good (step S5: NO), the process ends without executing step S6.

Figure 5:
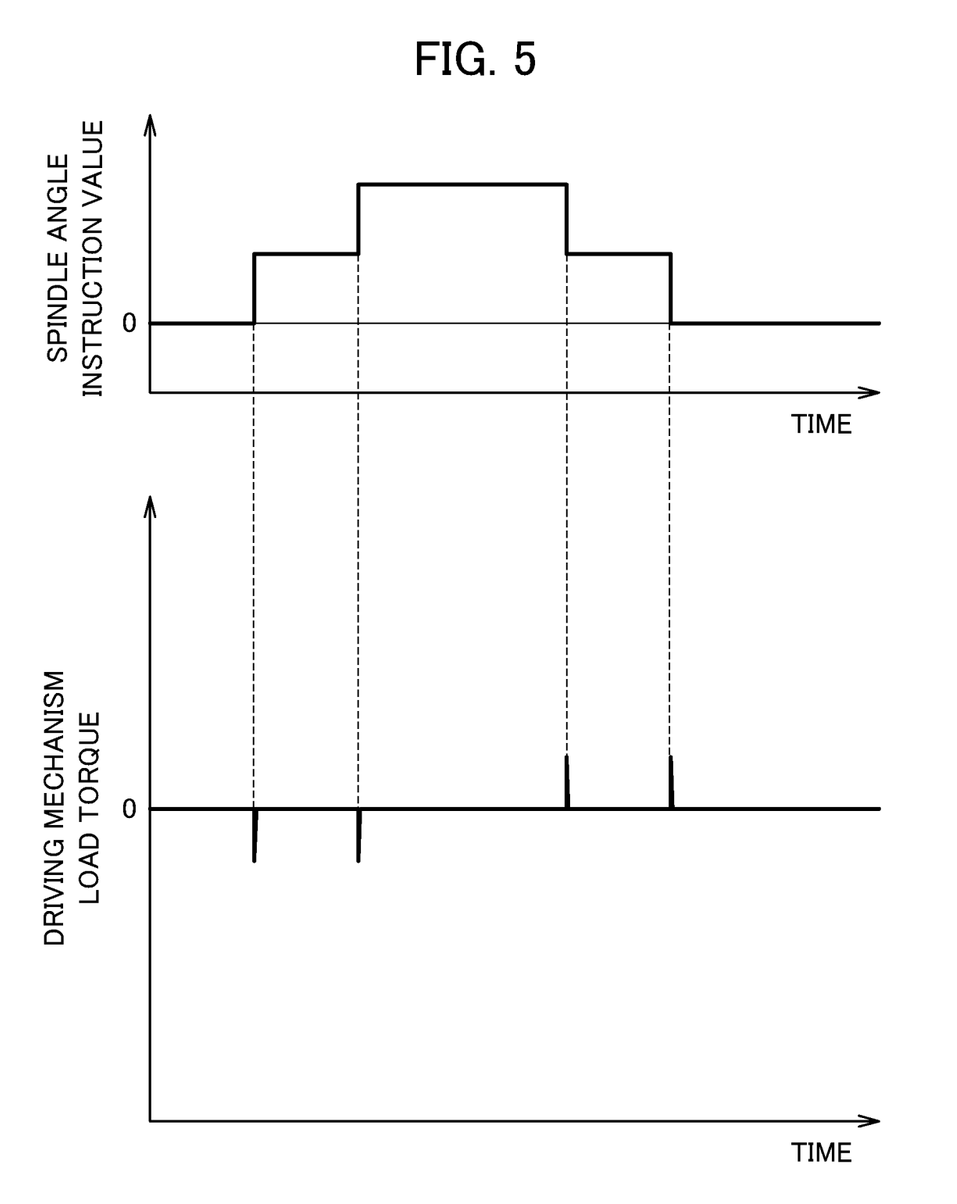
FIG. 5 is a graph illustrating an example of change in torque during a normal operation of a spindle of the rotary table device illustrated in FIG. 1.
Figure 6:
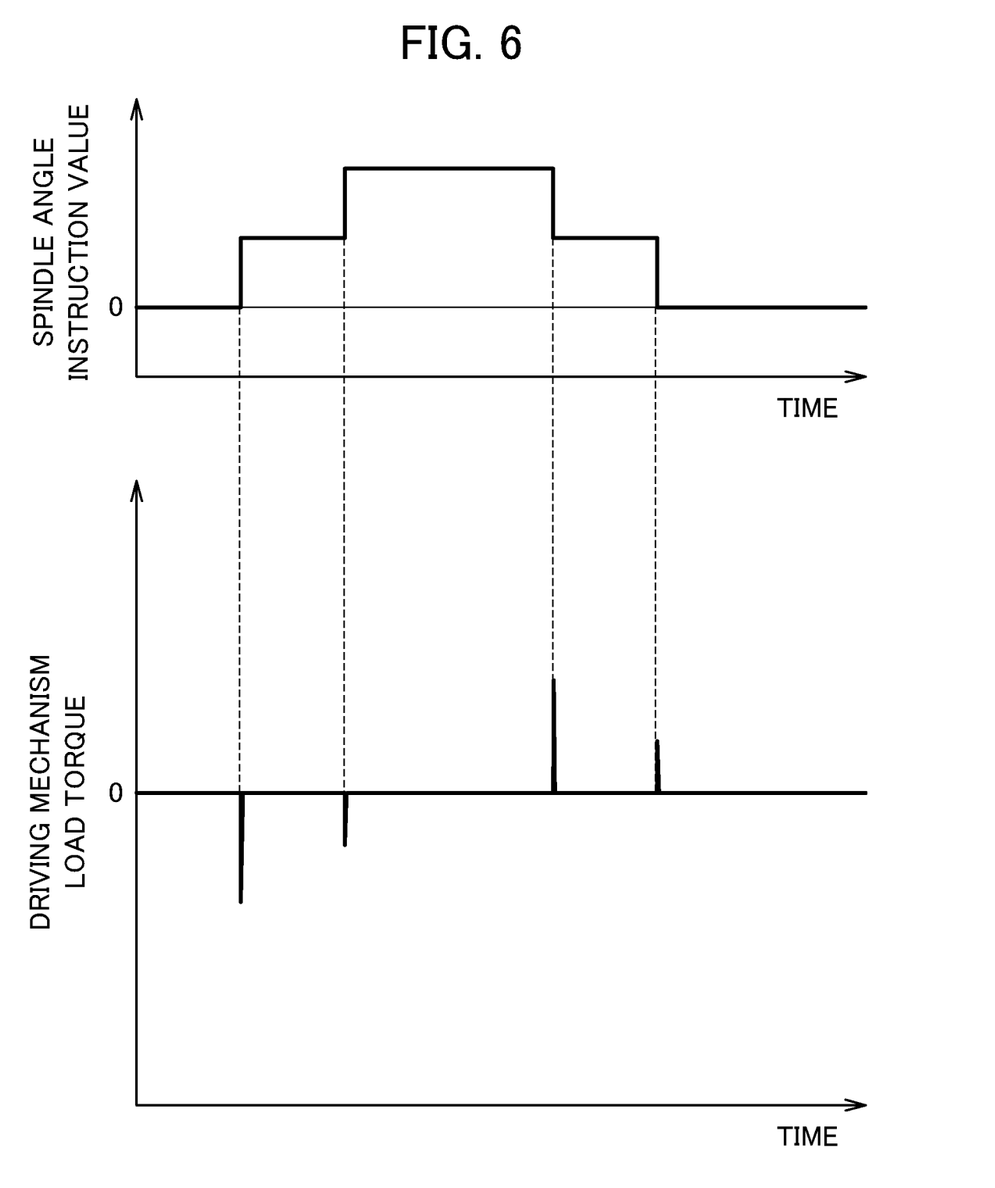
FIG. 6 is a graph illustrating an example of change in torque during malfunction of the spindle of the rotary table device illustrated in FIG. 1.
Figure 7:
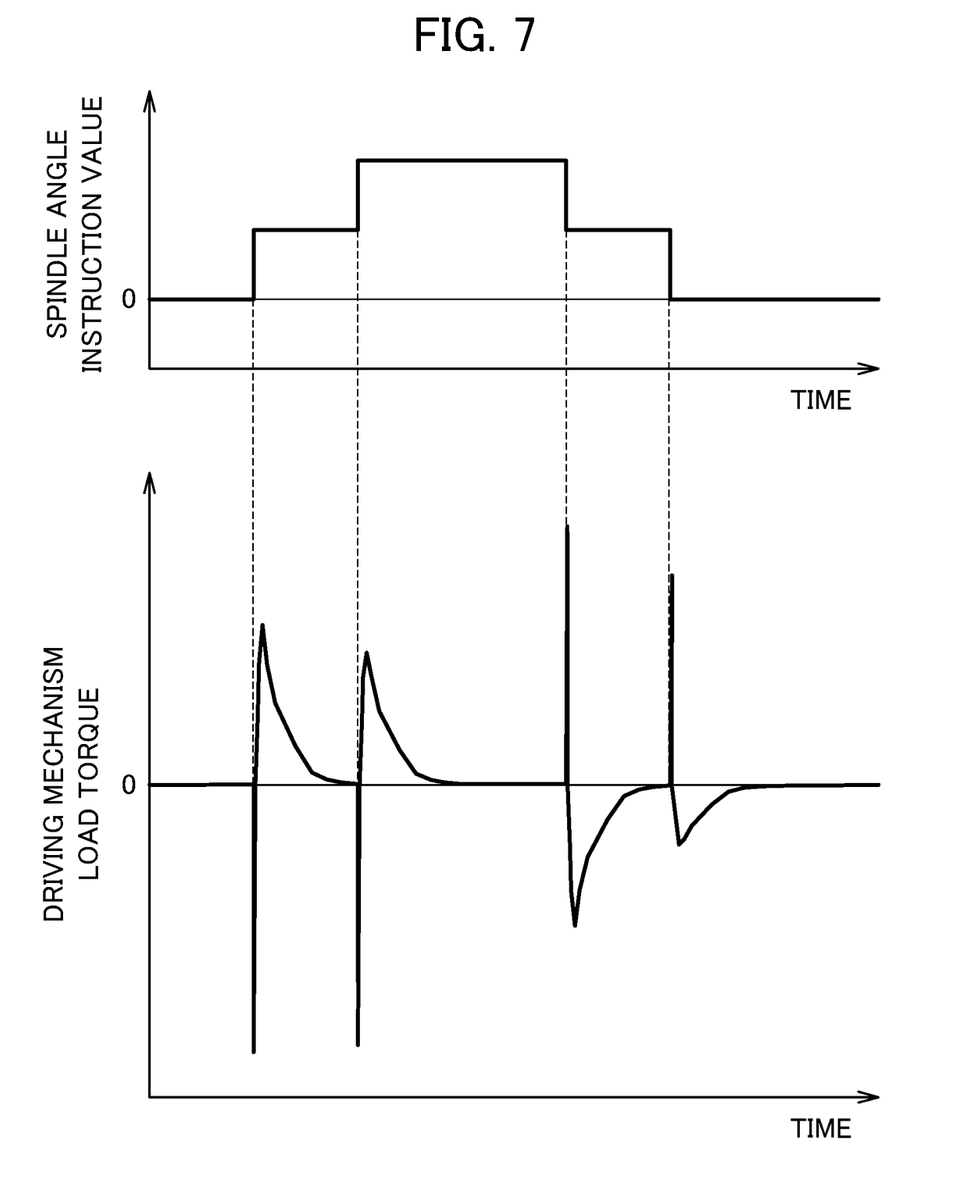
FIG. 7 is a graph illustrating an example of change in torque during malfunction different from FIG. 6, of the spindle of the rotary table device illustrated in FIG. 1.

FIGS. 5 to 7 illustrate an inspection pattern input from the rotation control portion 54 to the driving mechanism 2 i.e. changes over time at target angular positions of the spindle 1 and changes over time in the load torque detected by the load detection portion 3. FIG. 5 illustrates a case in which the operation of the clamp mechanism 1 is good, FIG. 6 illustrates a case in which the operation of the clamp mechanism 4 is delayed, and FIG. 7 illustrates a case in which the operation of the clamp mechanism 4 is not completed.

In FIGS. 5 to 7, as the inspection pattern, the driving mechanism 2 was caused to drive the spindle 1 by a predetermined inspection angle in a step form in a normal direction when a first predetermined period elapsed after the clamp control portion 53 instructed the clamp mechanism 4 to perform unclamping, and after that, the driving mechanism 2 was caused to drive the spindle 1 by the inspection angle in a step form in the same normal direction when a second predetermined elapsed. Moreover, FIGS. 5 to 7, after driving with the inspection pattern in the forward direction was performed, the clamp mechanism 4 was cause to perform clamping once to inhibit rotation of the spindle 1. After that, the clamp mechanism 4 was caused 1 to release clamping again, the driving mechanism 2 was caused to drive the spindle 1 with an inspection pattern in a reverse rotation direction, and then the change over time in the load torque was recorded.

As illustrated in FIG. 5, when the operation of the clamp mechanism 4 is good, a peak value (a first peak load value after elapse of the first period) of the load torque resulting from step-wise driving after elapse of the first period is substantially equal to a peak value (a first peak load value after elapse of the second period) of the load torque resulting from step-wise driving after elapse of the second period. That is, since unclamping of the clamp mechanism 4 has already been completed after the elapse of the first period, both load torques during driving after the elapse of the first and second periods decrease.

However, as illustrated in FIG. 6, when there is a delay in the operation of the clamp mechanism 4, since unclamping of the clamp mechanism 4 has not been completed after the elapse of the first period, the load detection portion 3 detects a relatively large load torque, and a load torque waveform similar to FIG. 5 is recorded since unclamping of the clamp mechanism 4 is completed after the elapse of the second period. Therefore, it can be determined that the clamp mechanism 4 has malfunctioned when the peak load value at the initial time after the elapse of the first period and the peak load value at the initial time after the elapse of the second period are compared and a difference between them is a certain value or more.

Moreover, as illustrated in FIG. 7, when the operation of the clamp mechanism 4 is not completed, the peak value of the load torque increases similarly to when the operation is delayed, and the load torque overshoots in the opposite direction after the peak, and a period is taken until the value of the load torque settles down. Therefore, by comparing the waveform shape of a load variation with a waveform shape recorded when the operation of the clamp mechanism 4 is good, it is possible to detect malfunction of the clamp mechanism 4 while suppressing abrasion of the clamp mechanism 4.

While the embodiments of the present invention have been described, the present invention is not limited to the above-described embodiments but can be changed appropriately.

Moreover, the effects described in the present embodiment are only examples of most preferable effects produced by the present invention, and the effects of the present invention are not limited to those described in the present embodiment.

The inspection pattern is not limited to the step-shaped inspection pattern, an arbitrary pattern such as, a pattern in which as angular position of the spindle changes in a ramp form may be used. Moreover, even when a step-shaped inspection pattern is used, the value of the first period required until driving of the spindle starts substantially after the start of unclamping may be set to zero depending on the features to be extracted from the change over time in the load.

EXPLANATION OF REFERENCE NUMERALS

1: Spindle
2: Driving mechanism
3: Load detection portion.
4: Clamp mechanism
5: Controller
51: Main control portion
52: Operation checking portion
53: Clamp control portion
54: Rotation control portion
55: Determination portion
56: Output portion
100: Table device

What is claimed is:

1. A rotary table device comprising:
a spindle that supports a table;
a driving mechanism that drives the spindle;
a load detection portion that detects a load of the driving mechanism;
a clamp mechanism that inhibits rotation of the spindle;
a rotation control portion that causes the driving mechanism to drive the spindle with a predetermined inspection pattern after the clamp mechanism starts releasing clamping; and
a determination portion that determines whether good or not with respect to an operation of the clamp mechanism based on a change over time in the load detected by the load detection portion when the spindle is driven with the inspection pattern, wherein
the inspection pattern is a pattern in which the spindle is driven by a predetermined inspection angle when a predetermined first period has elapsed after the clamp mechanism starts releasing clamping and when a predetermined second time has elapsed further after the elapse of the first time, and
the determination portion determines that the operation of the clamp mechanism has malfunctioned when a difference between a first peak load value after the elapse of the first period and a first peak load value after the elapse of the second period is a predetermined threshold or more.

2. The rotary table device according to claim 1, further comprising:
an output portion that notifies an outside of information related to a determination result or outputs a signal related to the determination result when the determination portion determines that the operation of the clamp mechanism has malfunctioned.

3. A controller that controls a rotary table device including a spindle that supports a table, a driving mechanism that drives the spindle, a load detection portion that detects a load of the driving mechanism, and a clamp mechanism that inhibits rotation of the spindle, the controller comprising:
a rotation control portion that causes the driving mechanism to drive the spindle with a predetermined inspection pattern after the clamp mechanism starts releasing clamping; and
a determination portion that determines whether good or not with respect to an operation of the clamp mechanism based on a change over time in the load detected by the load detection portion when the spindle is driven with the inspection pattern, wherein the inspection pattern is a pattern in which the spindle is driven by a predetermined inspection angle when a predetermined first period has elapsed after the clamp mechanism starts releasing clamping and when a predetermined second time has elapsed further after the elapse of the first time, and the determination portion determines that the operation of the clamp mechanism has malfunctioned when a difference between a first peak load value after the elapse of the first period and a first peak load value after the elapse of the second period is a predetermined threshold or more.

4. A non-transitory program recording medium recording a program thereon for controlling a rotary table device including a spindle that supports a table, a driving mechanism that drives the spindle, a load detection portion that detects a load of the driving mechanism, and a clamp mechanism that inhibits rotation of the spindle, the program comprising:

a rotation control element for causing the driving mechanism to drive the spindle with a predetermined inspection pattern after the clamp mechanism starts releasing clamping; and a determination element for determining whether good or not with respect to an operation of the clamp mechanism based on a change over time in the load detected by the load detection portion when the spindle is driven with the inspection pattern, wherein the inspection pattern is a pattern in which the spindle is driven by a predetermined inspection angle when a predetermined first period has elapsed after the clamp mechanism starts releasing clamping and when a predetermined second time has elapsed further after the elapse of the first time, and the determination element determines that the operation of the clamp mechanism has malfunctioned when a difference between a first peak load value after the elapse of the first period and a first peak load value after the elapse of the second period is a predetermined threshold or more.

5. A control method for a rotary table device including a spindle that supports a table, a driving mechanism that drives the spindle, a load detection portion that detects a load of the driving mechanism, and a clamp mechanism that inhibits rotation of the spindle, the method comprising:

causing the driving mechanism to drive the spindle with a predetermined inspection pattern after the clamp mechanism starts releasing clamping; and determining whether good or not with respect to an operation of the clamp mechanism based on a change over time in the load detected by the load detection portion when the spindle is driven with the inspection pattern, wherein the inspection pattern is a pattern in which the spindle is driven by a predetermined inspection angle when a predetermined first period has elapsed after the clamp mechanism starts releasing clamping and when a predetermined second time has elapsed further after the elapse of the first time, and the determining determines that the operation of the clamp mechanism has malfunctioned when a difference between a first peak load value after the elapse of the first period and a first peak load value after the elapse of the second period is a predetermined threshold or more.

* * * * *